(12) United States Patent
Sutter et al.

(10) Patent No.: US 9,168,851 B1
(45) Date of Patent: Oct. 27, 2015

(54) FOLDABLE HEAD RESTRAINT ASSEMBLY

(71) Applicants: Bob Sutter, Rockford, MI (US); John Witte, Ada, MI (US); Craig Ulman, Rockford, MI (US)

(72) Inventors: Bob Sutter, Rockford, MI (US); John Witte, Ada, MI (US); Craig Ulman, Rockford, MI (US)

(73) Assignee: GILL INDUSTRIES, INC., Grand Rapids, MI (US)

( * ) Notice: Subject to any disclaimer, the term of this patent is extended or adjusted under 35 U.S.C. 154(b) by 0 days.

(21) Appl. No.: 14/254,166

(22) Filed: Apr. 16, 2014

Related U.S. Application Data

(60) Provisional application No. 61/812,403, filed on Apr. 16, 2013.

(51) Int. Cl.
*B60R 22/28* (2006.01)
*B60N 2/427* (2006.01)
*B60N 2/48* (2006.01)
*B60R 21/055* (2006.01)

(52) U.S. Cl.
CPC ...................................... *B60N 2/487* (2013.01)

(58) Field of Classification Search
CPC ... B60N 2/4855; B60N 2/4844; B60N 2/4847
USPC ............................................ 297/408, 216.12
See application file for complete search history.

(56) References Cited

U.S. PATENT DOCUMENTS

| | | | | |
|---|---|---|---|---|
| 4,834,456 A * | 5/1989 | Barros et al. | .............. | 297/408 X |
| 6,176,475 B1 * | 1/2001 | Bella et al. | .................... | 267/120 |
| 6,655,733 B2 * | 12/2003 | Humer et al. | ............. | 297/408 X |
| 6,942,292 B2 * | 9/2005 | Low et al. | ................. | 297/408 X |
| 7,669,932 B1 * | 3/2010 | Gronninger et al. | ........... | 297/408 |
| 8,083,291 B2 * | 12/2011 | Yoshida | ........................ | 297/408 |
| 8,465,098 B2 * | 6/2013 | Yetukuri et al. | .............. | 297/408 |
| 2005/0088027 A1 * | 4/2005 | Yetukuri et al. | .............. | 297/408 |
| 2008/0203801 A1 * | 8/2008 | Jammalamadaka et al. | .. | 297/408 |
| 2010/0283305 A1 * | 11/2010 | Yetukuri et al. | .............. | 297/408 |
| 2011/0095592 A1 * | 4/2011 | Willard et al. | ................ | 297/408 |
| 2012/0068517 A1 * | 3/2012 | Yetukuri et al. | .............. | 297/408 |
| 2013/0140866 A1 * | 6/2013 | Yetukuri et al. | .............. | 297/408 |

* cited by examiner

*Primary Examiner* — Rodney B White
(74) *Attorney, Agent, or Firm* — Dickinson Wright PLLC

(57) ABSTRACT

A foldable head restraint assembly, including: a bracket assembly adapted for fixed disposition in a seat back; a head restraint support for mounting a bun assembly above the seat back, the head restraint support pivotally mounted to the bracket assembly so as to be pivotally movable relative to the bracket assembly in at least first and second directions between upright and folded positions; at least one biasing element biasing the head restraint support into one of the upright and folded positions; and at least one rotary damper which retards the motion of the head restraint support during at least a portion of the head restraint support's pivotal movement in at least one of the first and second directions.

17 Claims, 11 Drawing Sheets

FOLDABLE HEAD RESTRAINT ASSEMBLY

CROSS-REFERENCE TO RELATED APPLICATIONS

The present application relates to, and claims the benefit of priority from, U.S. Provisional Application Ser. No. 61/812,403, filed 16 Apr. 2013, the disclosure of which application is incorporated herein by reference in its entirety.

FIELD OF THE INVENTION

The invention relates generally to head restraints assemblies, such as, for instance, employed in vehicles.

BACKGROUND

Head restraint assemblies, which generally comprise a headrest component—commonly called a bun—adjustably supported above a seat-back, protect a vehicle occupant from serious injury due to sudden acceleration or deceleration of the vehicle. Conventionally, head restraint assemblies for at least front row vehicle seats are of the "high pivot" type—i.e., they permit adjustment of the headrest component forwardly and/or rearwardly relative to the seat-back in order to permit their proper positioning for the occupant. Adjustment is typically accomplished with a ratchet-style mechanism which permits the headrest component to be moved into one of a plurality of positions, each defined by the ratchet mechanism. Upon occupant actuation of a release means (such as, for instance, a button or lever), the ratchet mechanism is released to permit the head restraint to move under spring bias to either a full-forward—or folded—position or a full-upright position, depending upon the design of the head restraint assembly. From the folded position, the headrest component can be moved rearwardly toward the full-upright position while, from the full-upright position, the head restraint can be moved forwardly toward the forward position. According to either design, actuation of the release means causes the headrest component to move into one of the full-upright or folded positions with considerable force and speed. Ultimately, this force results in excessive wear on the components of the head restraint assembly, thereby prematurely reducing the operable lifetime of the assembly.

In second and third row vehicle seats, by contrast, the head restraint assemblies are typically cam-locked in an upright position and are not adjustable between the upright and folded positions. With increasing frequency, second and third row vehicle seats are also of the "STOW-AND-GO" type, according to which the seat and its associated headrest component are folded into essentially horizontal, stowed positions which provide greater interior storage room in the vehicle. In these "STOW-AND-GO" type systems, actuation of a release means causes the headrest component to be urged, under spring bias, into the folded position at a high rate of speed. Movement of the headrest component at this high rate is particularly necessary in applications where the release means is actuated simultaneously, or nearly simultaneously, with the movement of the vehicle seat back into the folded position. In such applications, it is important that the headrest component be in its folded position before the vehicle seat back reaches its folded position. Otherwise, the headrest component will abut the seat ahead of it and interfere with movement of the vehicle seat back into its folded position. In these applications as well, the force of motion of the head restraint assembly ultimately results in excessive wear on the head restraint assembly, thereby prematurely reducing its operable lifetime.

SUMMARY OF THE DISCLOSURE

There is disclosed a foldable head restraint assembly, comprising: a bracket assembly adapted for fixed disposition in a seat back; a head restraint support for mounting a bun assembly above the seat back, the head restraint support pivotally mounted to the bracket assembly so as to be pivotally movable relative to the bracket assembly in at least first and second directions between upright and folded positions; at least one biasing element biasing the head restraint support into one of the upright and folded positions; and at least one rotary damper which retards the motion of the head restraint support during at least a portion of the head restraint support's pivotal movement in at least one of the first and second directions.

According to one feature, the at least one biasing element biases the head restraint support into the folded position, and the at least one rotary damper retards the motion of the head restraint support's pivotal movement in the second direction as the head restraint support moves to the folded position.

According to another feature, the damping force of the at least one rotary damper increases so that the at least one rotary damper increasingly retards the motion of the head restraint support during at least a portion of the head restraint support's pivotal movement in at least one of the first and second directions.

Per a still further feature, the at least one biasing element biases the head restraint support into the folded position. According to this feature, the damping force of the at least one rotary damper increases so that the at least one damper increasingly retards the motion of the head restraint support during at least a portion of the head restraint support's pivotal movement in the second direction as the head restraint support moves to the folded position.

Per a still further feature, the at least one rotary damper is any of a viscous damper or a pressure damper.

According to yet another feature, the at least one rotary damper provides a substantially constant damping force throughout at least a portion of the head restraint support's pivotal movement in at least one of the first and second directions.

In one form, the head restraint support comprises at least one support arm fixed to a pivot shaft rotatably associated with the bracket assembly so that the head restraint support is pivotally movable relative to the bracket assembly in the at least first and second directions between the upright and folded positions. The at least one rotary damper comprises a housing fixed to the bracket assembly so as to be stationary relative to the head restraint support as the head restraint support pivotally moves relative to the bracket assembly in the at least first and second directions, and a rotor secured to the pivot shaft so as to be moveable therewith as the head restraint support pivotally moves relative to the bracket assembly in the at least first and second directions.

According to a still further feature, the rotor housing includes a radially extending portion including an open-ended slot therein, the open-ended slot receiving therein a pin disposed on the bracket assembly, whereby the housing is maintained stationary relative to the head restraint support as the head restraint support pivotally moves relative to the bracket assembly in the at least first and second directions.

Per another feature, the at least one rotary damper retards the motion of the head restraint support during at least a portion of the head restraint support's pivotal movement in each of the first and second directions.

In one embodiment, the foldable head restraint assembly comprises: a bracket assembly adapted for fixed disposition in a seat back; a head restraint support for mounting a bun assembly above the seat back, the head restraint support pivotally mounted to the bracket assembly so as to be pivotally movable relative to the bracket assembly in at least first and second directions between upright and folded positions; at least one biasing element biasing the head restraint support into the folded position; and at least one rotary damper which retards the motion of the head restraint support's pivotal movement in the second direction as the head restraint support moves to the folded position.

Per one feature, the damping force of the at least one rotary damper increases so that the at least one rotary damper increasingly retards the motion of the head restraint support during at least a portion of the head restraint support's pivotal movement in the second direction.

According to another feature, the at least one rotary damper is any of a viscous damper or a pressure damper.

According to a further feature, the at least one rotary damper provides a substantially constant damping force throughout at least a portion of the head restraint support's pivotal movement in at least one of the first and second directions.

In one form, the head restraint support comprises at least one support arm fixed to a pivot shaft rotatably associated with the bracket assembly so that the head restraint support is pivotally movable relative to the bracket assembly in the at least first and second directions between the upright and folded positions. The at least one rotary damper comprises a housing fixed to the bracket assembly so as to be stationary relative to the head restraint support as the head restraint support pivotally moves relative to the bracket assembly in the at least first and second directions, and a rotor secured to the pivot shaft so as to be moveable therewith as the head restraint support pivotally moves relative to the bracket assembly in the at least first and second directions.

Per another feature, the rotor housing includes a radially extending portion including an open-ended slot receiving therein a pin disposed on the bracket assembly, whereby the housing is maintained stationary relative to the head restraint support as the head restraint support pivotally moves relative to the bracket assembly in the at least first and second directions.

These and other features of the present invention will be more readily understood and appreciated by reference to the written description and accompanying drawings.

DETAILED DESCRIPTION

Figure 1:
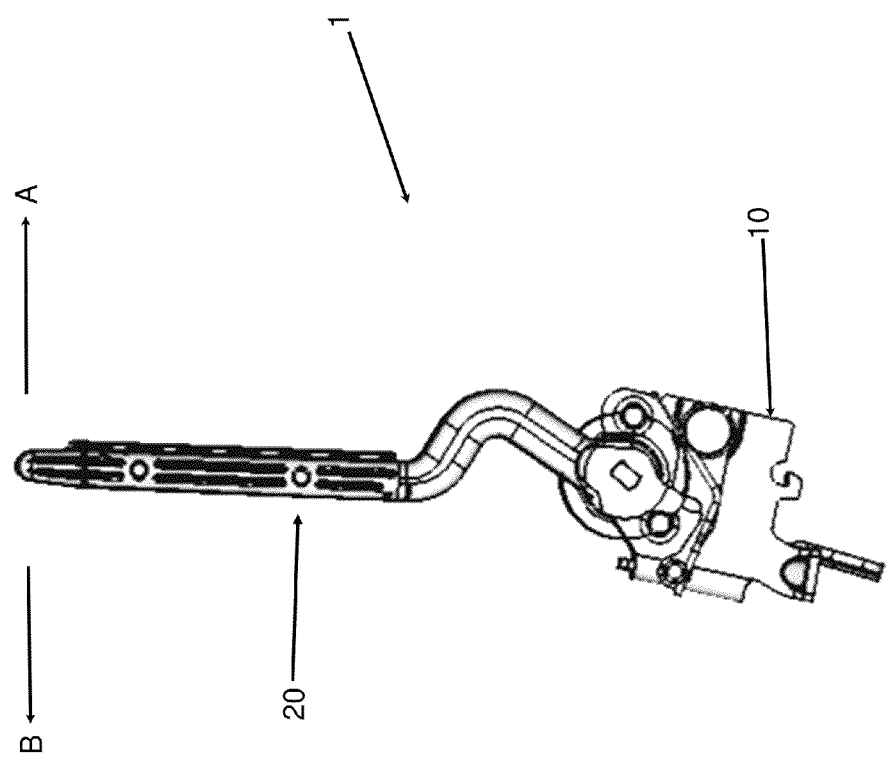
FIG. 1 is a lateral view of the head restraint assembly of the present invention according to a first exemplary embodiment.

Referring to FIGS. 1 through 7, wherein like numerals indicate like or corresponding parts throughout the several views, the present invention may be seen to comprise, according to a first exemplary embodiment, a foldable head restraint assembly (indicated generally at 1) comprising: a bracket assembly 10 adapted for fixed disposition in a seat back (not shown); a head restraint support 20 for mounting a bun assembly (not shown) above the seat back, the head restraint support 20 pivotally mounted to the bracket assembly 10 so as to be pivotally movable relative to the bracket assembly 10 in at least first (A) and second (B) directions between upright (shown in FIGS. 1-7) and folded (not shown, but characterized in that the head restraint support is rotated as much as approximately 90 degrees from the upright position); at least one biasing element 30 biasing the head restraint support into one of the upright and folded positions; and at least one rotary damper 40 for retarding the motion of the head restraint support 20 during at least a portion of the head restraint support's pivotal movement in at least one of the first and second directions.

While the following exemplary embodiment of the invention is described in the specific operational environment of a head restraint assembly for a vehicle, such as an automobile, it will be appreciated that the present invention may be adapted to other seating systems, as well.

According to the illustrated embodiment, the foldable head restraint assembly 1 is of the "low-pivot" variety, meaning that the bracket assembly 10 is contained within a seat back, while the head restraint support 20 extends through the top of the seat back through a slot-shaped opening or openings which accommodates forward and rearward movement of the head restraint support 20 relative to the bracket assembly 10 in order to permit movement of the bun assembly (not shown) into folded and fully-upright positions.

Head restraint support 20 may be of conventional construction, comprising, as shown by way of example and not limitation, a pair of separate, spaced-apart supports arms 21. Supports arms 21 may be made of metal, polymer, polymer-coated metal or other materials suitable to the purpose. Each support arm 21 terminates in a free upper end 22 (see, e.g., FIG. 2) which is received in a corresponding opening of the bun assembly. Per convention, the bun assembly may also be adjustably positionable along the upper length of each support arm 21 so as to permit vertical adjustments in the position of the bun assembly relative to the seatback. Of course, the head restraint support 20 may be comprised of fewer or more supports 21, and of different configurations, than those depicted in the exemplary embodiment.

Bun assemblies usable in connection with the present invention may, according to convention, comprise a core structure having disposed thereover a cover of fabric or other material, with a suitable padding material (e.g., foam) disposed in between the cover and core structure. Of course, those skilled in the art will appreciate that the present invention may be utilized with any conventional bun assembly.

Bracket assembly 10 is largely of conventional construction, and includes a bracket adapted to be secured to the internal framework of the vehicle seat back (not shown) by ordinary means, such as bolts, etc. Bracket 10 is made of metal or other suitably material and may be unitary or monolithic. Per convention, bracket is characterized by a central portion 11 extending between a pair of spaced-apart end walls 12. Each end wall 12 defines an opening therethrough for receiving the ends of a pivot shaft 13 extending therebetween. Each end 13a of the pivot shaft 13 is keyed with a non-circular cross-sectional shape. These ends are received in correspondingly-shaped openings provided in the lower ends 23 of each support arm 21. Accordingly, each support arm 21 is fixed to the pivot shaft 13 for common rotation, all per convention.

Figure 2:
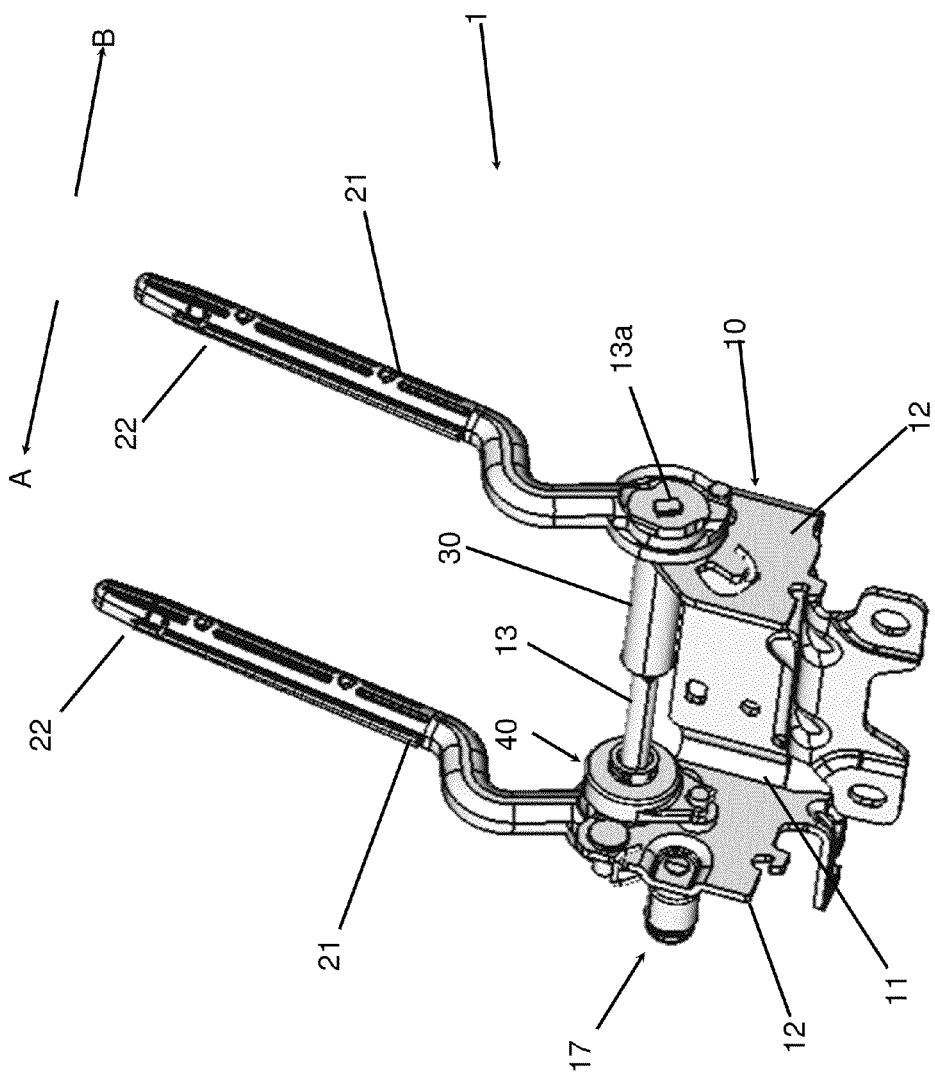
FIG. 2 is a perspective view of the head restraint assembly of FIG. 1.
Figure 3:
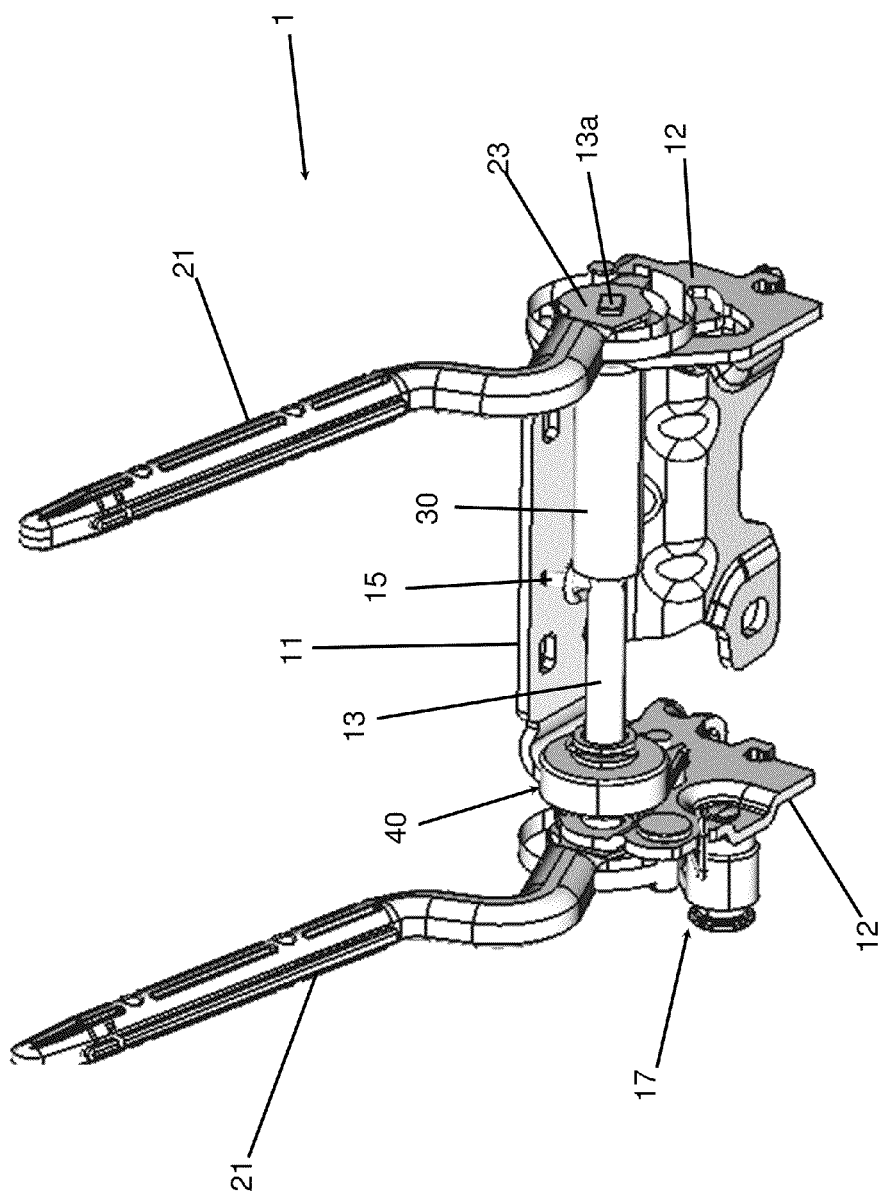
FIG. 3 is a perspective view of the head restraint assembly of FIG. 1.
Figure 4:
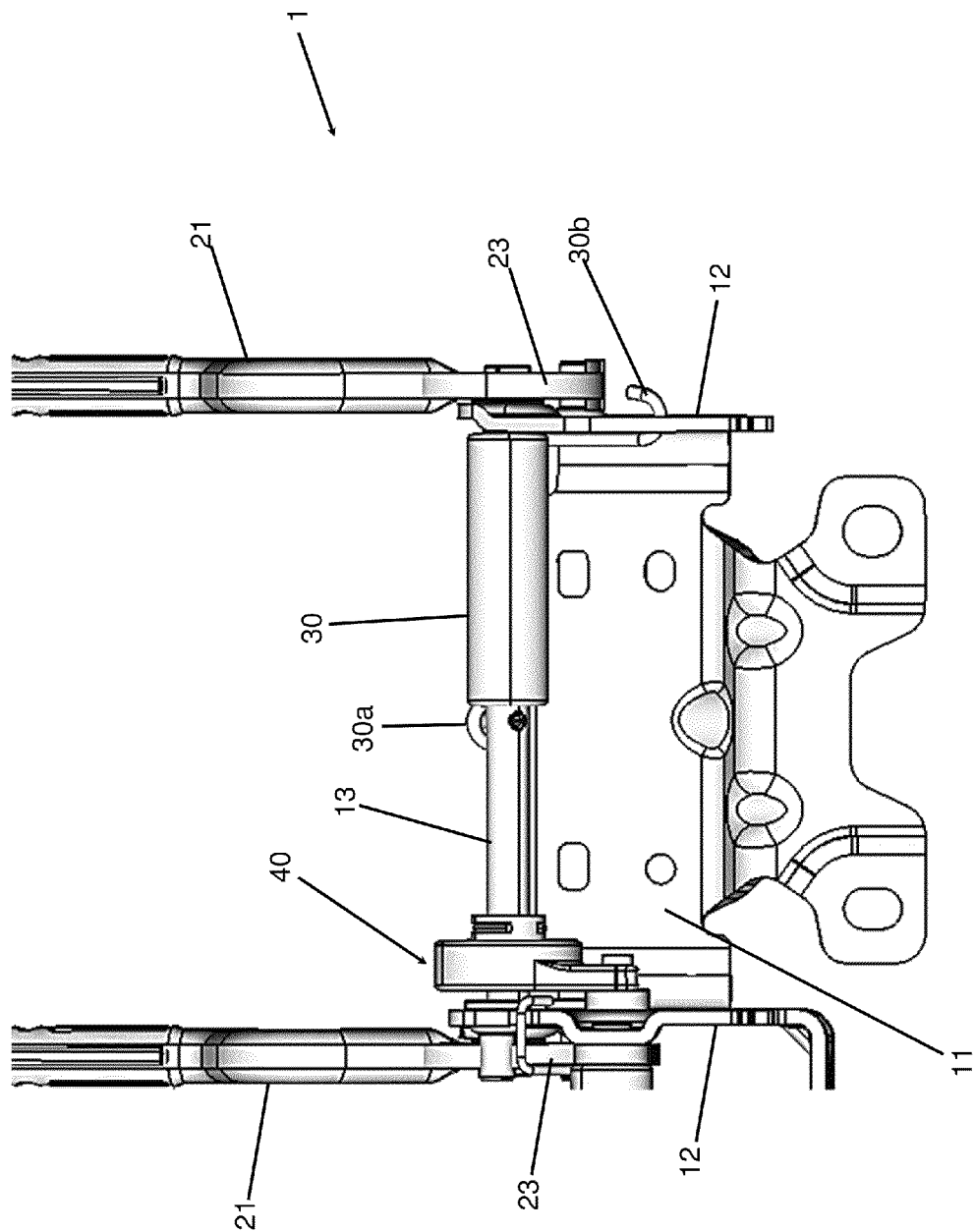
FIG. 4 is a partial frontal view of the head restraint assembly of FIG. 1, detailing the bracket assembly.
Figure 5:
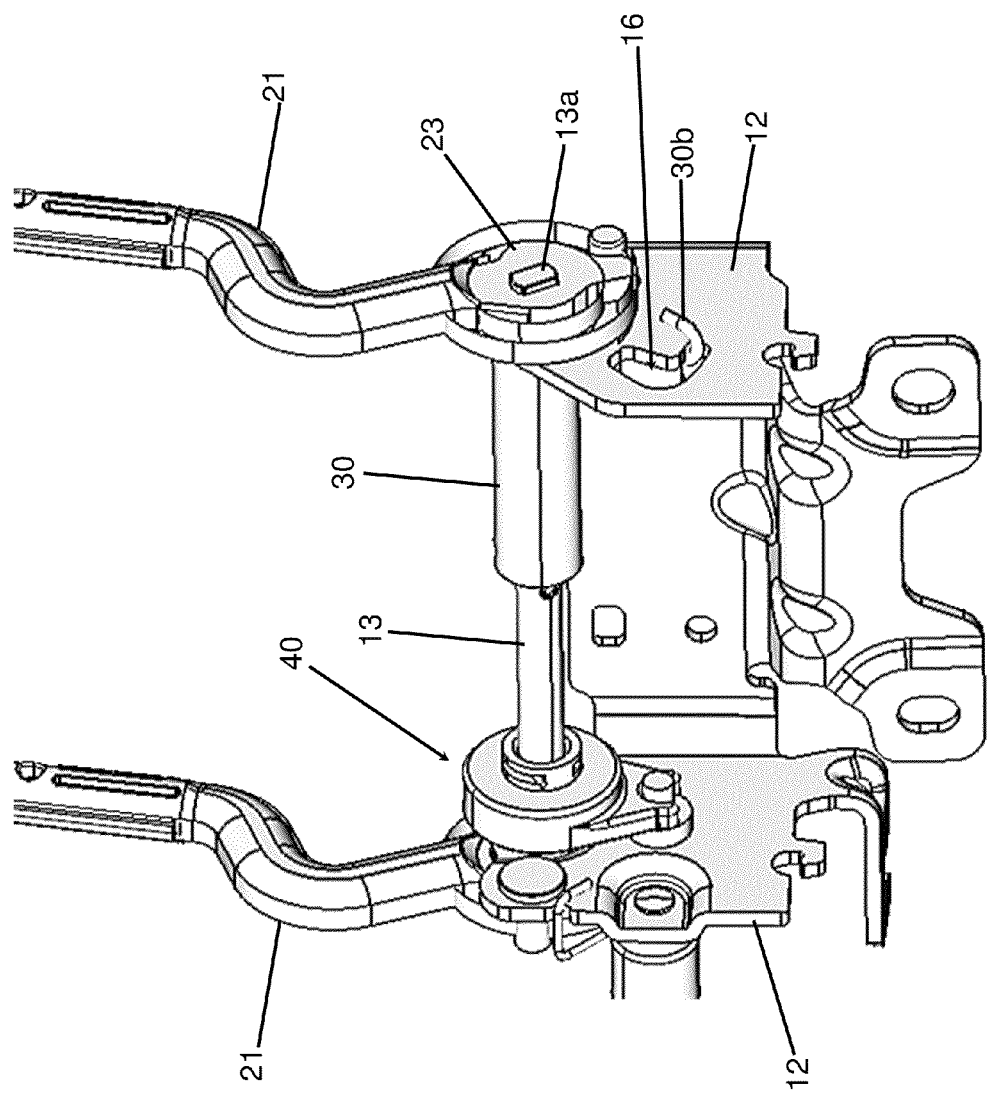
FIGS. 5 and 6 are partial perspective views of the head restraint assembly of FIG. 1, detailing the bracket assembly.
Figure 6:
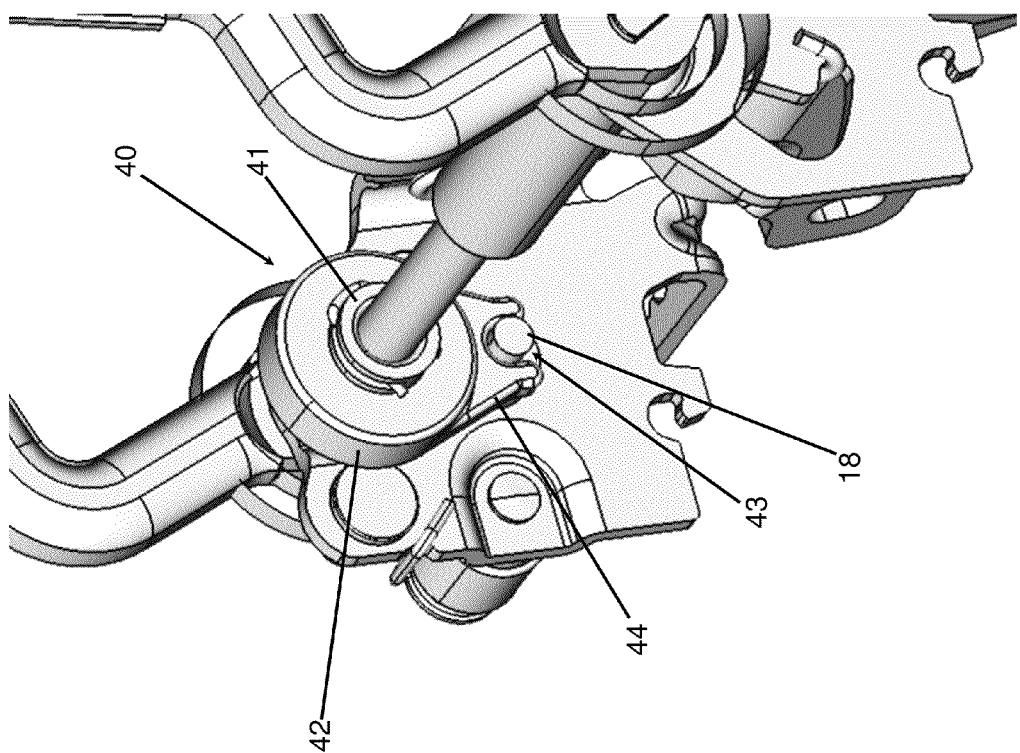
Figure 7:
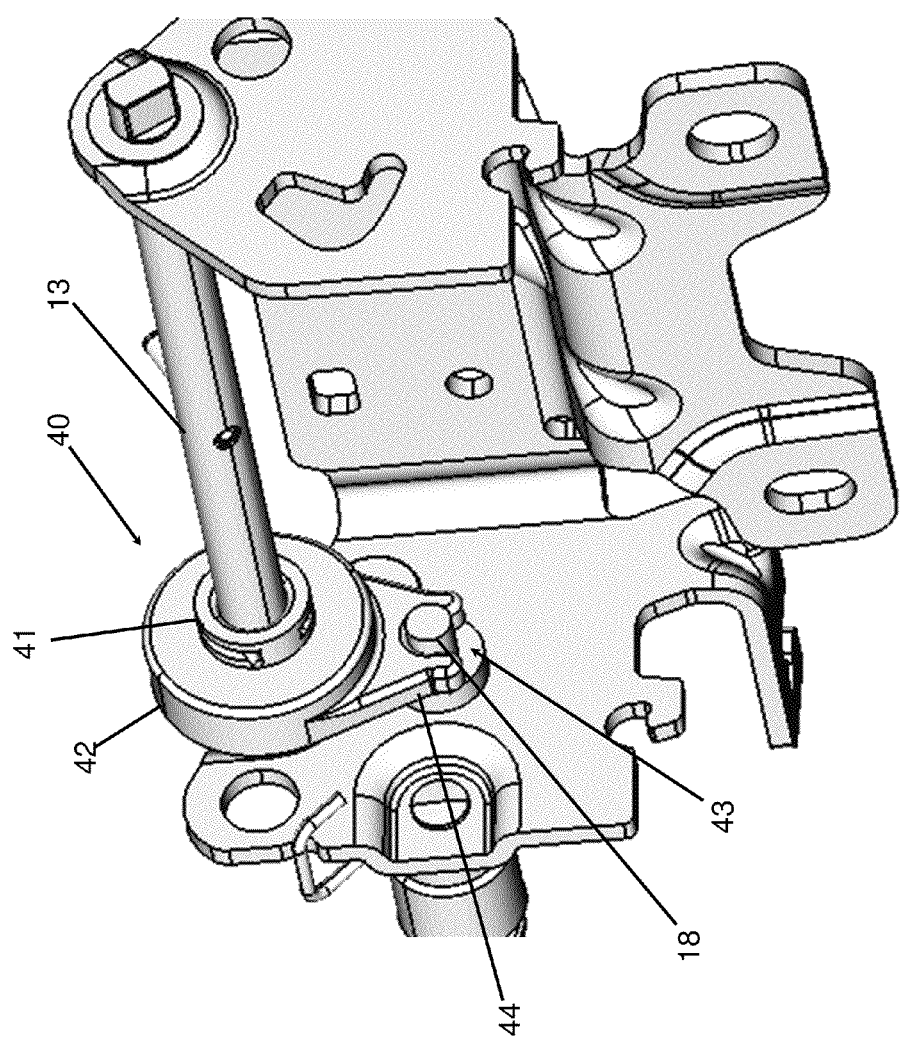
FIG. 7 is a perspective view of the head restraint assembly of FIG. 1, shown with the biasing element and headrest support removed for clarity in depicting the damper.
Figure 8:
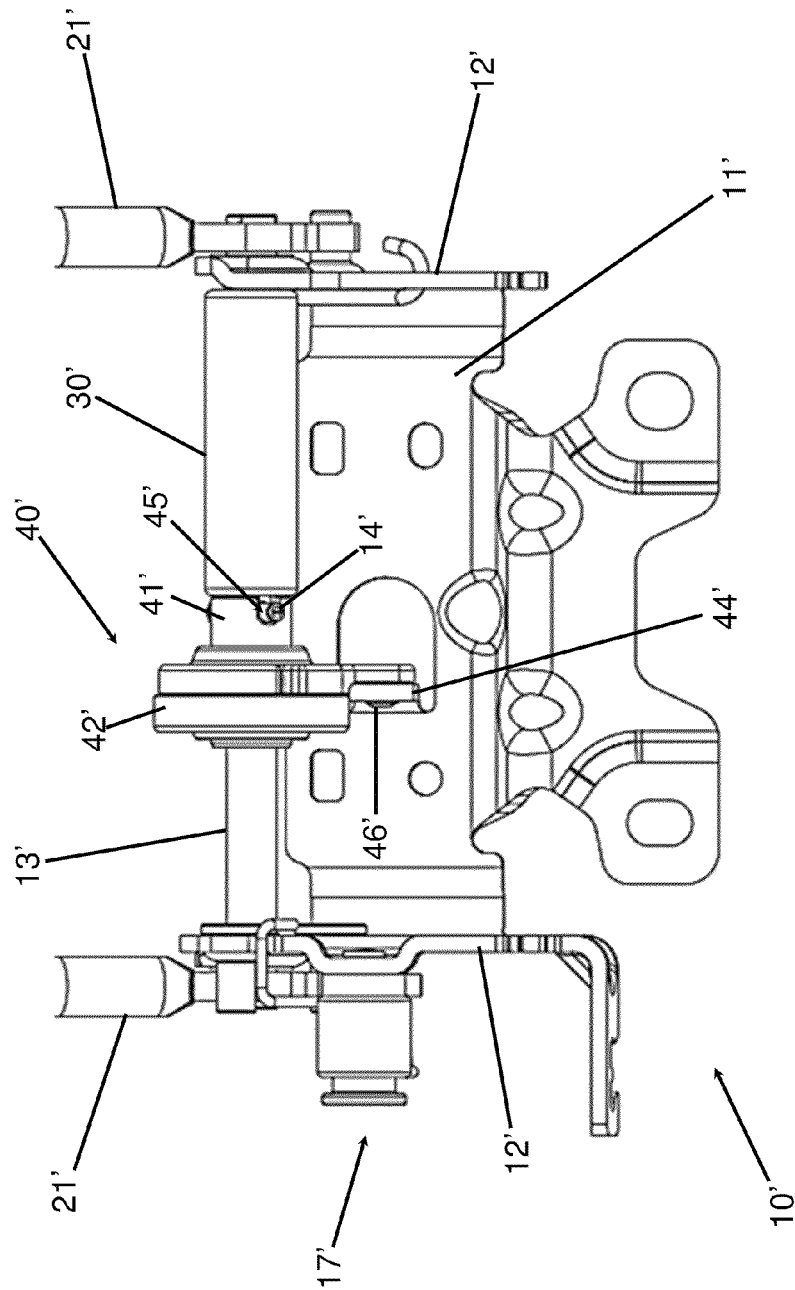
FIG. 8 is a partial, frontal view of the head restraint assembly of the present invention according to a second exemplary embodiment.
Figure 9:
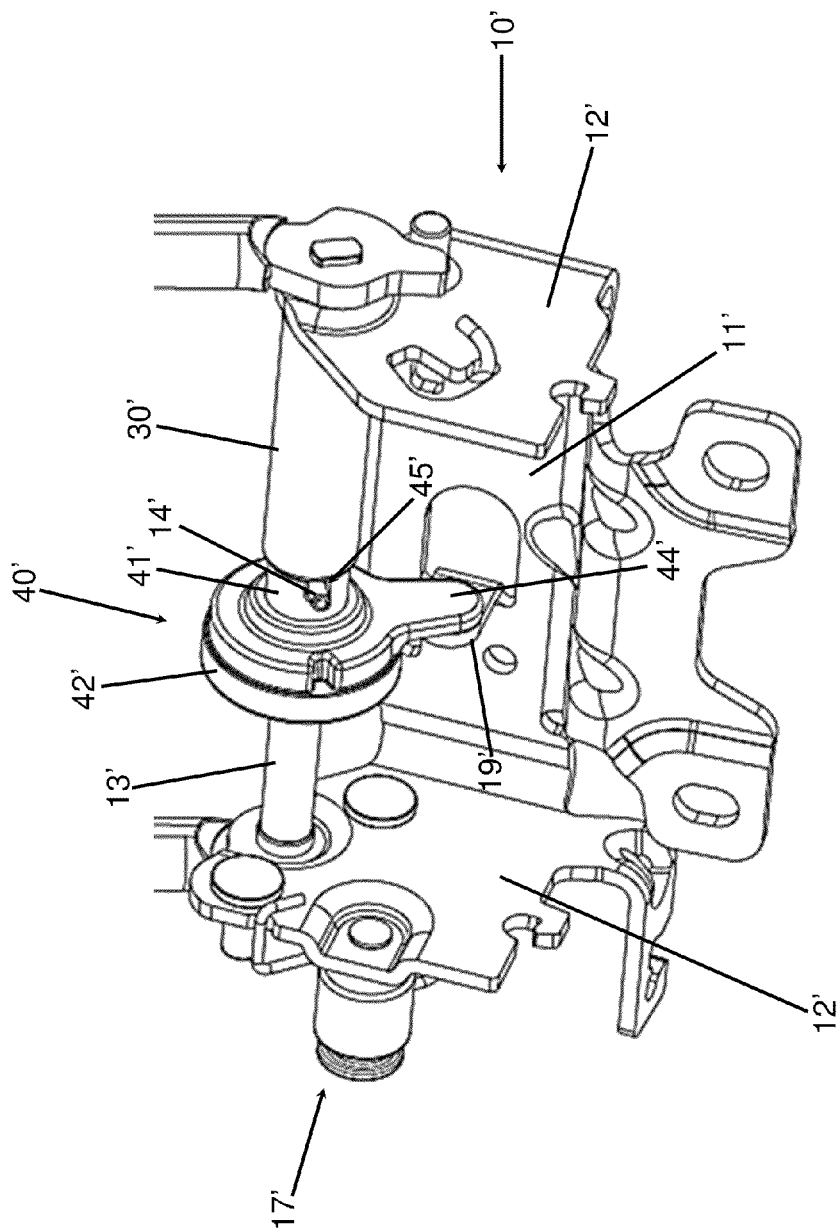
FIG. 9 is a partial, perspective view of the head restraint assembly of FIG. 8, shown from a first side.
Figure 10:
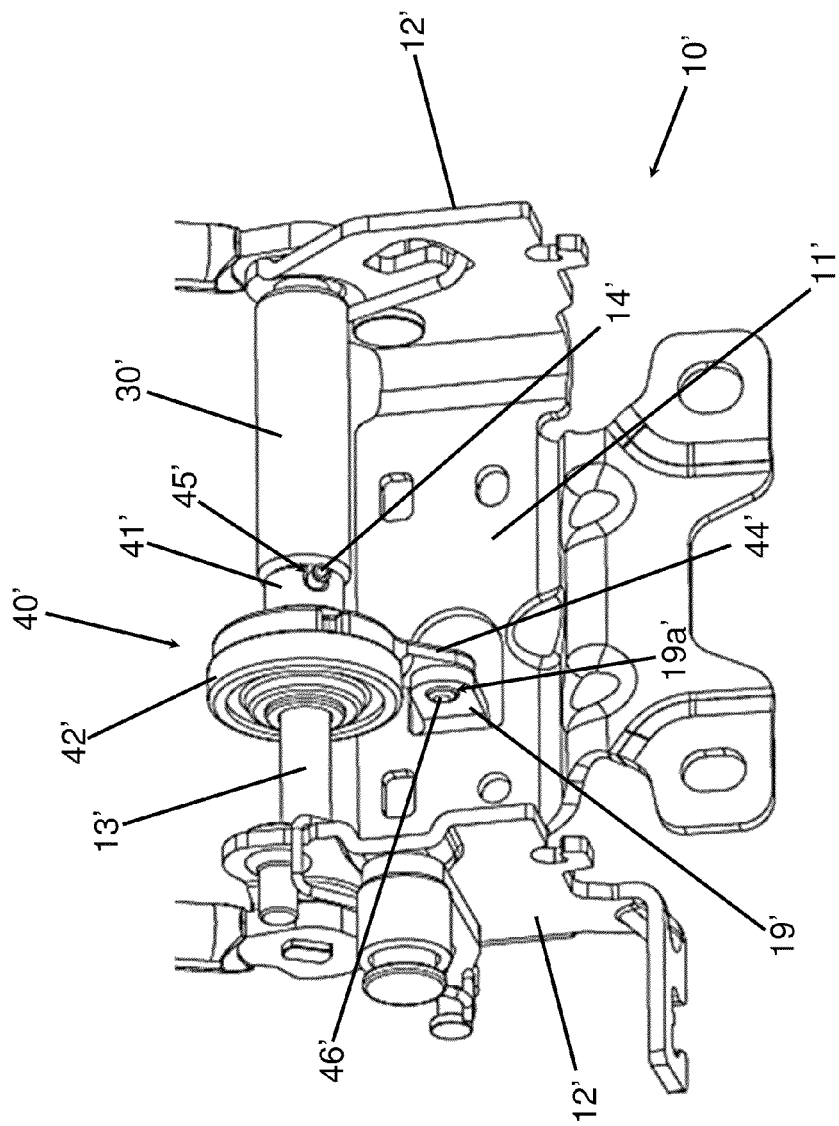
FIG. 10 is a partial, perspective view of the head restraint assembly of FIG. 8, shown from a second side.
Figure 11:
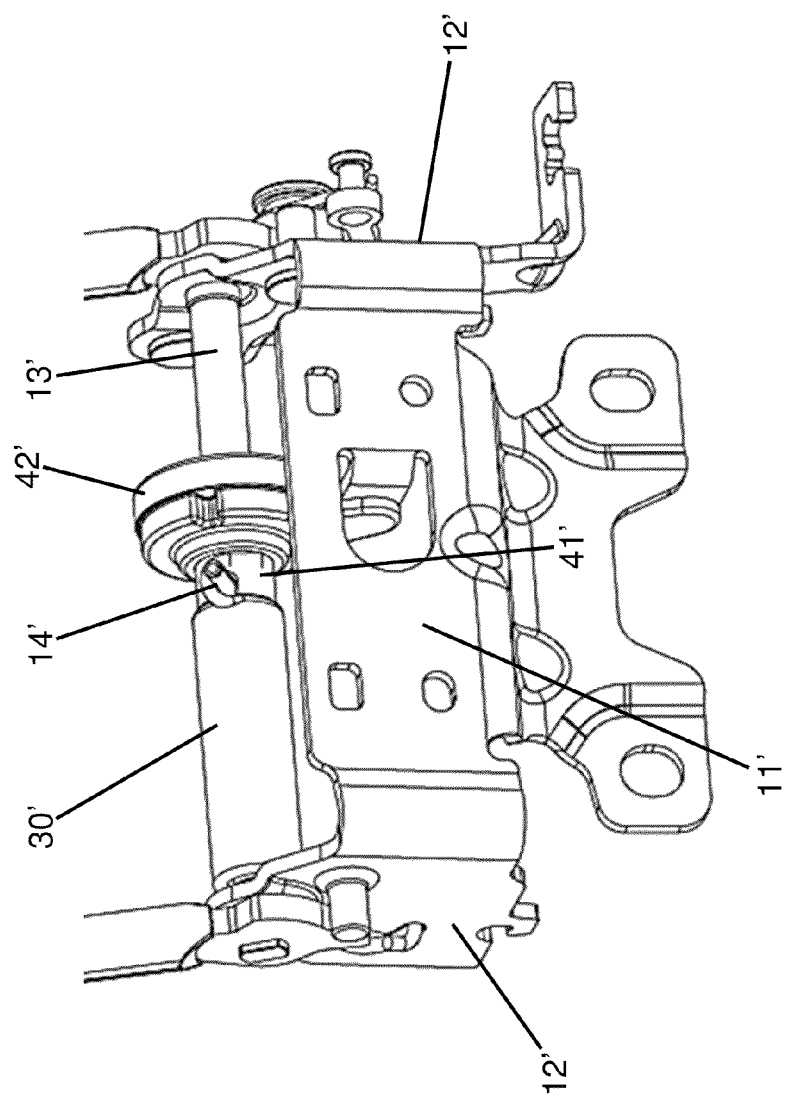
FIG. 11 is a partial, rear perspective view of the head restraint assembly of FIG. 8.

A biasing element 30 in the form, according to the illustrated embodiment, of a torsion spring is disposed over the pivot shaft 13. Biasing element 30 is secured at one end 30a to the pivot shaft 13, such as via the post 15. At another end 30b, biasing element 30 is secured to the bracket 10, such as via the opening 16 in one of the end walls 12, as best shown in FIGS. 2 through 4. Biasing element 30 according to the illustrated embodiment is "loaded" in the upright position of the head restraint support 20, such that the biasing force urges the head restraint support 20 into the folded position thereof.

Per convention, the bracket assembly 10 supports an actuator (indicated generally at 17) which is operative to effect movement of the head restraint support 20 from the upright to the folded position under the force of biasing element 30. In the exemplary embodiment, according to which the head restraint assembly is provided in second and/or third row, stow-and-go type seats, this actuator may take the form of a release mechanism which is coupled, such as by a release cable (not shown), to a release mechanism for the vehicle seat back. More particularly, the release cable is adapted to be placed in tension as the seat back moves from a fully upright to a folded position. In this manner, movement of both the head restraint support 20 (and the bun supported thereon) and vehicle seat back can occur substantially simultaneously and through user actuation of only a single release mechanism.

With particular reference to FIGS. 2 and 5 through 7, the present invention may be seen to include a rotary damper 40 for damping the pivotal movement of the head restraint support in at least one of the first and second directions. More particularly according to the illustrated embodiment, rotary damper 40 damps the pivotal movement of the head restraint support in the second direction as the head restraint support moves to the folded position.

Per convention, rotary damper 40 comprises, in the illustrated embodiment, a rotor 41 which moves relative to a stationary housing 42. Rotor includes a central opening that is shaped to be received over a complementary-shaped keyed portion of the pivot shaft 13. In this manner, those skilled in the art will appreciate that rotor 41 and pivot shaft 13 rotate together during pivotal movement of the headrest support arms 21 under the force of biasing element 30.

Rotor housing 42 is fixed to a bracket end wall 12, such as by receipt of a pin 18 within a corresponding slot 43 provided in a radially extending portion 44 of the housing. Accordingly, it will be appreciated that housing is stationary as rotor 41 and pivot shaft 13 rotate together during pivotal movement of the headrest support arms 21 under the force of biasing element 30.

Damper 40 may operate according to any conventional principle of operation, and so may be, by way of example and without limitation, a viscous damper (creating resistance through the viscous resistance of a medium, such as silicone oil), or a pressure damper (creating torque via movement of a medium, such as silicone oil, through a valve). Damper 40 may also, for example and without limitation, be a continuous rotary damper, providing a substantially constant damping force throughout at least a portion of the head restraint support's pivotal movement in at least one of the first and second directions, or a load-responsive—or ramped—damper, providing increasing retardation of the motion of the head restraint support during at least a portion of the head restraint support's pivotal movement in at least one of the first and second directions.

It will be understood that damper 40 according to the illustrated embodiment is a one-way damper; that is, it serves to damp the force of motion of the headrest support 20 as it moves into the folded position thereof under the action of biasing element 30. It will be appreciated that such an embodiment has utility in, for example, second and third row, "stow-and-go" type vehicle seats. However, two-way dampers may also be utilized where damping is desired for movement of the headrest support 20 in both the first and second directions. Likewise, one-way dampers may be incorporated into head restraint assemblies of the present invention where the headrest support is biased into the fully-upright, rather than the folded, position thereof.

Referring next to FIGS. 8 through 11, there is shown a second embodiment of the invention. The second embodiment is in all material respects identical to the embodiment of FIGS. 1 through 7 except in the construction and mounting of the rotary damper, as specified below.

More particularly, rotary damper 40' comprises a rotor 41' which moves relative to a stationary housing 42'. Rotor 41' comprises a cylindrical sleeve, as depicted, which sleeve extends beyond the stationary housing 42'. The cylindrical sleeve of rotor 41' defines a central opening that is received over the pivot shaft 13'. Rather than being shaped to be received over a complementary-shaped, keyed portion of the pivot shaft, as in the first embodiment, rotor 41' is fixed to the pivot shaft 13' for common movement by means of a roll pin 14' disposed on and extending radially from the pivot shaft 13', which roll pin 14' is received in a "U"-shaped cut-out 45' which, as depicted, opens outwardly at an end of the cylindrical sleeve of the rotor 41'. In this manner, those skilled in the art will appreciate that rotor 41' and pivot shaft 13' rotate together during pivotal movement of the headrest support arms 21' under the force of biasing element 30'.

Notably, roll pin 14' may also serve as the common point of attachment for an end of the biasing element 30' (which point of attachment is, per convention, necessary to create the requisite tension in the biasing element to rotate the pivot shaft 13' in the desired direction).

As with the embodiment of FIGS. 1 through 7, rotor housing 42' is fixed to the bracket 10'. According to this second embodiment, however, it can be seen that the bracket 10' includes a flange 19' extending upwardly from the bracket central portion 11'. Flange 19' may be a separate component attached to the bracket central portion 11' or, as shown, may be formed from the central portion 11' itself (such as, for instance, by cutting out portions of the central portion 11' to define the flange 19' and bending the flange away from the central portion 11'). Flange 19' includes an opening 19a' and, optionally, a bushing therein in which is received the pin 46' extending orthogonally from radially extending portion 44' of the housing 42'. By the foregoing, it will be appreciated that housing 42' is stationary as rotor 41' and pivot shaft 13' rotate together during pivotal movement of the headrest support arms 21' under the force of biasing element 30'.

While the invention is shown embodied in a head restraint assembly which is characterized by movement of the head restraint support between fully-upright and folded positions, it should be understood that a damper may be incorporated in other types of head restraint assemblies, including, by way of non-limiting example, adjustable head restraint assemblies wherein the head restraint support is moveable into any of a plurality of positions between the fully-upright and folded positions. Further, while the invention of the illustrated embodiments is shown embodied in a "low-pivot" mechanism, it is also contemplated that the invention of this disclosure may be employed in "high-pivot" mechanisms—that is, head restraint assemblies in which the bun assembly pivots forwardly and rearwardly relative to the head restraint support.

The above description is of preferred embodiments. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention in which an exclusive property or privilege is claimed is defined as follows:

1. A foldable head restraint assembly, comprising:
   a bracket assembly adapted for fixed disposition in a seat back;
   a head restraint support for mounting a bun assembly above the seat back, the head restraint support pivotally mounted to the bracket assembly so as to be pivotally movable relative to the bracket assembly in at least first and second directions between upright and folded positions;
   at least one biasing element biasing the head restraint support into one of the upright and folded positions;
   at least one rotary damper which retards the motion of the head restraint support during at least a portion of the head restraint support's pivotal movement in at least one of the first and second directions; and
   wherein a damping force of the at least one rotary damper increases so that the at least one rotary damper increasingly retards the motion of the head restraint support during at least a portion of the head restraint support's pivotal movement in at least one of the first and second directions.

2. The foldable head restraint assembly of claim 1, wherein the at least one biasing element biases the head restraint support into the folded position, and the at least one rotary damper retards the motion of the head restraint support's pivotal movement in the second direction as the head restraint support moves to the folded position.

3. The foldable head restraint assembly of claim 1, wherein the at least one biasing element biases the head restraint support into the folded position, and wherein the damping force of the at least one rotary damper increases so that the at least one damper increasingly retards the motion of the head restraint support during at least a portion of the head restraint support's pivotal movement in the second direction as the head restraint support moves to the folded position.

4. The foldable head restraint assembly of claim 1, wherein the at least one damper is any of a viscous damper or a pressure damper.

5. The foldable head restraint assembly of claim 1, wherein the at least one damper provides a substantially constant damping force throughout at least a portion of the head restraint support's pivotal movement in at least one of the first and second directions.

6. The foldable head restraint assembly of claim 1, wherein the head restraint support comprises at least one support arm fixed to a pivot shaft rotatably associated with the bracket assembly so that the head restraint support is pivotally movable relative to the bracket assembly in the at least first and second directions between the upright and folded positions; and
   wherein the at least one rotary damper comprises a housing fixed to the bracket assembly so as to be stationary relative to the head restraint support as the head restraint support pivotally moves relative to the bracket assembly in the at least first and second directions, and a rotor secured to the pivot shaft so as to be moveable movable therewith as the head restraint support pivotally moves relative to the bracket assembly in the at least first and second directions.

7. The foldable head restraint assembly of claim 6, wherein the housing includes a radially extending portion including an open-ended slot therein, the open-ended slot receiving therein a pin disposed on the bracket assembly, whereby the housing is maintained stationary relative to the head restraint support as the head restraint support pivotally moves relative to the bracket assembly in the at least first and second directions.

8. The foldable head restraint assembly of claim 1, wherein the at least one rotary damper retards the motion of the head restraint support during at least a portion of the head restraint support's pivotal movement in each of the first and second directions.

9. A foldable head restraint assembly, comprising:
   a bracket assembly adapted for fixed disposition in a seat back;
   a head restraint support for mounting a bun assembly above the seat back, the head restraint support pivotally mounted to the bracket assembly so as to be pivotally movable relative to the bracket assembly in at least first and second directions between upright and folded positions;
   at least one biasing element biasing the head restraint support into the folded position;
   at least one rotary damper which retards the motion of the head restraint support's pivotal movement in the second direction as the head restraint support moves to the folded position; and
   wherein a damping force of the at least one rotary damper increases so that the at least one rotary damper increasingly retards the motion of the head restraint support during at least a portion of the head restraint support's pivotal movement in the second direction.

10. The foldable head restraint assembly of claim 9, wherein the at least one damper is any of a viscous damper or a pressure damper.

11. The foldable head restraint assembly of claim 9, wherein the at least one rotary damper provides a substantially constant damping force throughout at least a portion of the head restraint support's pivotal movement in at least one of the first and second directions.

12. The foldable head restraint assembly of claim 9,
   wherein the head restraint support comprises at least one support arm fixed to a pivot shaft rotatably associated with the bracket assembly so that the head restraint support is pivotally movable relative to the bracket assembly in the at least first and second directions between the upright and folded positions; and wherein the at least one rotary damper comprises a housing fixed to the bracket assembly so as to be stationary relative to the head restraint support as the head restraint support pivotally moves relative to the bracket assembly in the at least first and second directions, and a rotor secured to the pivot shaft so as to be movable therewith as the head restraint support pivotally moves relative to the bracket assembly in the at least first and second directions.

13. The foldable head restraint assembly of claim 12, wherein the housing includes a radially extending portion including an open-ended slot therein, the open-ended slot receiving therein a pin disposed on the bracket assembly, whereby the housing is maintained stationary relative to the head restraint support as the head restraint support pivotally moves relative to the bracket assembly in the at least first and second directions.

14. A head restraint assembly, comprising:

a head restraint support for mounting a bun assembly above the seat back, the bun assembly being movable forwardly and/or rearwardly relative to the head restraint support;

at least one rotary damper which retards the motion of the bun assembly during at least a portion of the bun assembly's movement in at least one of the forward and rearward directions; and wherein a damping force of the at least one rotary damper increases so that the at least one rotary damper increasingly retards the motion of the bun assembly during at least a portion of the bun assembly's pivotal movement in at least one of the forward and rearward directions.

15. The head restraint assembly of claim 14, wherein the at least one rotary damper is any of a viscous damper or a pressure damper.

16. The head restraint assembly of claim 14, wherein the at least one rotary damper provides a substantially constant damping force throughout at least a portion of the bun assembly's pivotal movement in at least one of the forward and rearward directions.

17. The head restraint assembly of claim 14, wherein the at least one rotary damper retards the motion of the bun assembly during at least a portion of the bun assembly's pivotal movement in each of the forward and rearward directions.

* * * * *